United States Patent [19]

Utsumi

[11] Patent Number: 4,901,236
[45] Date of Patent: Feb. 13, 1990

[54] PIPELINE CONTROLLING SYSTEM TO INCREASE EFFECTIVE ADDRESS CALCULATION PERFORMANCE

[75] Inventor: Tohru Utsumi, Yokohama, Japan

[73] Assignee: Kabushiki Kaisha Toshiba, Kawasaki, Japan

[21] Appl. No.: 128,795

[22] Filed: Dec. 4, 1987

[30] Foreign Application Priority Data

Dec. 5, 1986 [JP] Japan ............................ 61-289031

[51] Int. Cl.⁴ .............................................. G06F 9/38
[52] U.S. Cl. ................................ 364/200; 364/231.8; 364/263
[58] Field of Search ............................ 364/200, 900

[56] References Cited

U.S. PATENT DOCUMENTS 4,402,042 8/1983 Guttag ............................ 364/200

Primary Examiner—Raulfe B. Zache
Attorney, Agent, or Firm—Foley & Lardner, Schwartz, Jeffery, Schwaab, Mack, Blumenthal & Evans

[57] ABSTRACT

A pipeline controlling system executing a preceding instruction in parallel with calculation of an effective address of a succeeding instruction, comprises a first instruction register for storing and holding the preceding instruction, which is in an execute phase; a second instruction register for storing and holding the succeeding instruction, which is in an effective address phase; a register file for storing and holding information to be used for executing the preceding instruction and for calculating the effective address of a succeeding instruction; an effective address calculating portion for calculating the effective address of the succeeding instruction; a comparator for comparing information for designating in the register file a storing location of information to be used for executing the preceding instruction with information for designating in the register file a storing location of information to be used for calculating the effective address of the succeeding instruction; and a controlling circuit for controlling the effective address calculating portion such that the calculation of the effective address of the succeeding instruction is carried out in parallel with the execution of the preceding instruction according to information in a pipeline controlling region and according to a result of the comparison of the comparator, when the comparator outputs a coincidence signal and the information in the pipeline controlling region indicates that the contents of the register file is not changed.

8 Claims, 3 Drawing Sheets

PIPELINE CONTROLLING SYSTEM TO INCREASE EFFECTIVE ADDRESS CALCULATION PERFORMANCE

BACKGROUND OF THE INVENTION

1. Field of the Invention

The present invention relates to a pipeline controlling system for a calculator, and particularly to a pipeline controlling system which is capable of improving processing speed.

2. Description of the Prior Art

A pipeline controlling system has been adopted in a recent microprocessor to improve the processing speed thereof. The pipeline controlling system divides an instruction into several stages and processes it such that the respective stages are operated parallel to each other, and such that an instruction to be processed next is read before completing the processing of the first instruction.

FIG. 1 is a block diagram showing the constitution of a conventional pipeline controlling system which comprises a first instruction register 1, a second instruction register 3, a register file 5, a comparator 7, and an effective address calculating portion 9. In FIG. 1, the first instruction register 1 stores and holds a preceding instruction which is in an execute phase. The second instruction register 3 stores and holds a succeeding instruction to be executed after the preceding instruction. The instruction stored in the second instruction register 3 is subjected to the calculation of an effective address thereof.

The register file 5 has a plurality of registers such as base registers and index registers to be used for executing the preceding instruction stored in the first instruction register 1 and calculating the effective address of the succeeding instruction stored in the second instruction register 3. In the register file 5 a register used for executing the preceding instruction is selected in accordance with the information of a Reg1 field of the preceding instruction stored in the first instruction register 1, namely, in accordance with the value of a DR field which indicates the register to be used by the first instruction register 1 in executing the preceding instruction. A register used for calculating the effective address of the succeeding instruction is selected in the register file 5 in accordance with the information of a Reg2 field of the succeeding instruction stored in the second instruction register 3, namely, in accordance with the value of an IX field which indicates the register to be used by the second instruction register 3 in calculating the effective address.

The comparator 7 is arranged to compare the information of the Reg1 field of the preceding instruction stored in the first instruction register 1 with the information of the Reg2 field of the succeeding instruction stored in the second instruction register 3. As a result of the comparison, if the information of the Reg1 field coincides with the information of the Reg2 field, i.e., if the register to be used in executing the preceding instruction is the same as the one to be used in calculating the effective address of the succeeding instruction, the comparator 7 outputs a coincidence signal to the effective address calculating portion 9.

On the other hand, if the information of the Reg1 field does not coincide with the information of the Reg2 field, i.e., if the register used for executing the preceding instruction differs from the one used for calculating the effective address of the succeeding instruction, the comparator 7 outputs a noncoincidence signal to the effective address calculating portion 9.

The effective address calculating portion 9 is constructed to calculate the effective address of the succeeding instruction stored in the second instruction register 3. Namely when the noncoincidence signal is supplied from the comparator 7 to the effective address calculating portion 9, the effective address of the succeeding instruction is calculated by using the register of the register file 5 which has been selected in accordance with the information of the Reg2 field of the succeeding instruction stored in the second instruction register 3, and, in parallel with this calculation, the preceding instruction is executed and processed by using the register with the information of the Reg1 field of the preceding instruction.

On the other hand, if the register used for executing the preceding instruction coincides with the register to be used for calculating the effective address of the succeeding instruction and, therefore, if the comparator 7 outputs a coincidence signal to the effective address calculating portion 9, the execution of the preceding instruction is completed first as shown in FIG. 2 to define information to be stored in the register which has been used for executing the preceding instruction. After that, the effective address of the succeeding instruction is calculated according to the defined information.

As described in the above, when a register to be used for executing a preceding instruction stored in the first instruction register 1 coincides with a register to be used for calculating the effective address of a succeeding instruction stored in the second instruction register 3, the conventional system executes the preceding instruction first to define the contents of the register used for executing the preceding instruction, and then calculates an effective address of the succeeding instruction.

Depending on the kind of preceding instruction stored in the first instruction register 1, there may be a case that, after the execution of the preceding instruction, the contents of a register designated by the Reg1 field of the preceding instruction and used for executing the instruction remain the same before and after the execution. In this case, if an effective address of the succeeding instruction is calculated after the completion of the execution of the preceding instruction as described in the above, the calculation of the effective address is delayed. Therefore, the speed of the pipeline processing is lowered, thereby decreasing the processing speed of a calculater which executes pipeline processing.

SUMMARY OF THE INVENTION

In consideration of the above discussion, an object of the present invention is to provide a pipeline controlling system which calculates an effective address of a succeeding instruction before completing the execution of a preceding instruction, even if registers to be used by the preceding and succeeding instructions coincide with each other, if the contents of the register remain unchanged before and after the execution of the preceding instruction such that the parallel processing efficiency of pipeline processing is improved, and the processing speed of a calculator which executes the pipeline processing is increased.

In order to accomplish the object mentioned in the above, a feature of the present invention resides in a pipeline controlling system executing an instruction in parallel with a calculation of an effective address, comprising a first storing means for storing and holding a preceding instruction which is in an execute phase; a second storing means for storing and holding a succeeding instruction which is in a calculation phase of its effective address; a third storing means for storing and holding information to be used for executing the preceding instruction and for calculating the effective address of the succeeding instruction; an effective address calculating means for calculating an effective address of the instruction stored in the second storing means; a comparing means for comparing information for designating in the third storing means a storing location of information to be used for executing the instruction stored in the first storing means with information for designating in the third storing means a storing location of information to be used for calculating the effective address of the instruction stored in the second storing means; and a controlling means for controlling the effective address calculating means such that the calculation of the effective address of the succeeding instruction is carried out in parallel with the execution of the preceding instruction according to information in a pipeline controlling region and according to a result of the comparison of the comparing means, when the comparing means outputs a coincidence signal and when the information of the pipeline controlling region indicates that the contents of the third storing means do not change.

According to the pipeline controlling system described above, when information to be used for the preceding instruction which is in an execute phase coincides with information to be used for the succeeding instruction which is in a calculation phase of an effective address, and when information in a pipeline controlling region of the preceding instruction indicates that the information to be used in executing the preceding instruction does not change, the preceding instruction is executed in parallel with the calculation of the effective address of the succeeding instruction.

BRIEF DESCRIPTION OF THE DRAWINGS

These and other objects, features and advantages of the present invention will become apparent from the following description of a preferred embodiment taken in conjunction with the accompanying drawings in which.

DETAILED DESCRIPTION OF THE PREFERRED EMBODIMENTS

An embodiment of the present invention will be described with reference to the drawings.

Figure 3:
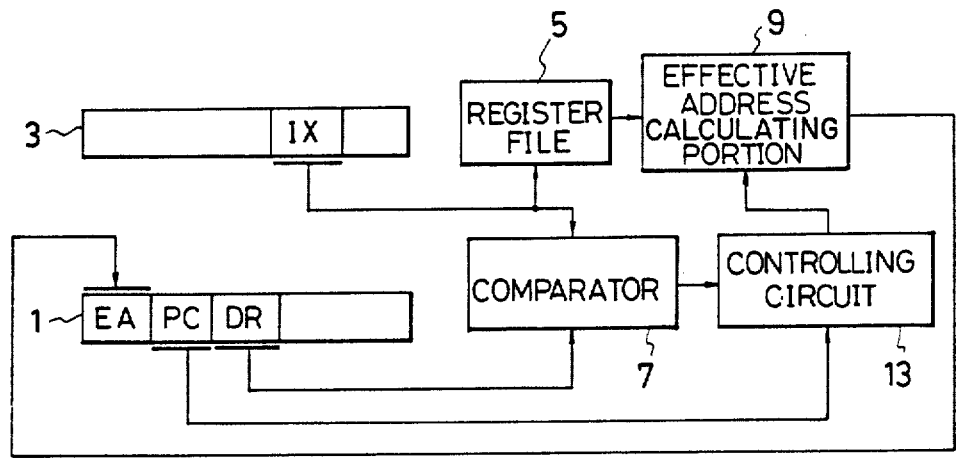
FIG. 3 is a block diagram showing the constitution of a pipeline controlling system according to a preferred embodiment of the present invention.

FIG. 3 is a block diagram showing a pipeline controlling system according to an embodiment of the present invention. As shown in this figure, according to the pipeline controlling system, there is provided a pipeline controlling region (hereinafter referred to as a "PC field") in an instruction to be executed. The PC field indicates whether or not the contents of a register file to be used in executing the instruction are changed by the execution of the instruction. According to information in the PC field, an effective address of a succeeding instruction is calculated in parallel with the execution of the preceding instruction.

As shown in FIG. 3, the pipeline controlling system of this embodiment comprises a first instruction register 1, a second instruction register 3, a register file 5, a comparator 7, a controlling circuit 13, and an effective address calculating portion 9.

The comparator 7 compares information (i.e., a register number) of a Reg1 field which specifies, in the register file 5, information to be used to execute a preceding instruction stored in the first instruction register 1 with information (i.e., a register number) of a Reg2 field which specifies, in the register file 5, information to be used to calculate the effective address of a succeeding instruction stored in the second instruction register 3.

Namely, the information of the Reg1 field is a value of a DR field indicating a register to be used for executing the preceding instruction in the first instruction register 1 and the information of the Reg2 field is a value of an IX field indicating a register to be used for calculating the effective address of the succeeding instruction in the second instruction register 3.

As a result of the comparison, if the information of the Reg1 field of the preceding instruction coincides with the information of the Reg2 field of the succeeding instruction, the comparator 7 sends a coincidence signal to the controlling circuit 13. On the other hand, if the information of the Reg1 field does not coincide with the information of the Reg2 field, the comparator 7 sends a noncoincidence signal to the controlling circuit 13.

According to the information of a PC field of the preceding instruction stored in the first instruction register 1 and according to a signal sent from the comparator 7, the controlling circuit 13 supplies a command signal to the effective address calculating portion 9 to calculate an effective address.

When the noncoincidence signal is supplied from the comparator 7, the command signal is supplied from the controlling circuit 13 to the effective address calculating portion 9. On the other hand, if the coincidence signal is supplied from the comparator 7, the command signal is supplied from the controlling circuit 13 depending on the information in the PC field of the preceding instruction stored in the first instruction register 1.

Namely, if the information in the PC field of the preceding instruction indicates that the contents of a register to be used for executing the instruction remain unchanged, the command signal is supplied from the controlling circuit 13 to the effective address calculating portion 9. If the information in the PC field of the preceding instruction indicates that the contents of the register to be used for executing the instruction may change, the command signal is not supplied from the controlling circuit 13 to the effective address calculating portion 9.

The effective address calculating portion 9 calculates the effective address of the succeeding instruction stored in the second instruction register 3. Namely when the command signal is supplied from the controlling circuit 13, the effective address calculating portion 9 used a register which is selected and specified in the register file 5 according to the Reg2 field of the succeeding instruction, to calculate the effective address of the succeeding instruction.

Examples of the controlling circuit 13 and effective address calculating portion 9 which execute the above-mentioned functions will be described with reference to FIG. 5.

Figure 5:
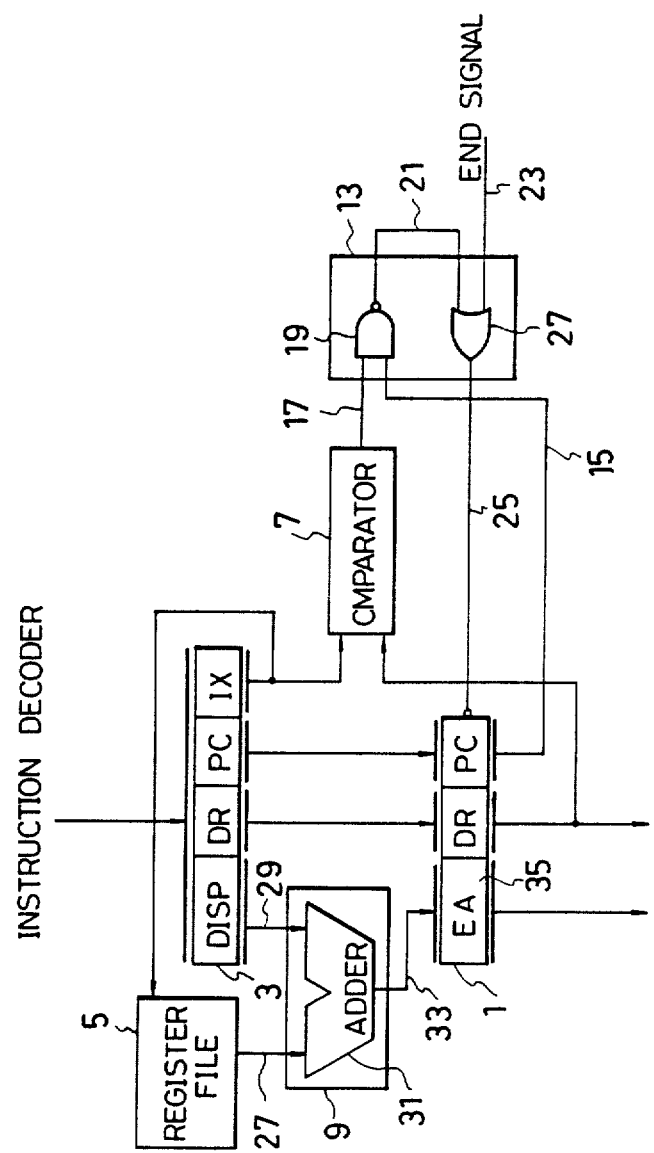
FIG. 5 is a circuit diagram showing the details of a controlling circuit and an effective address calculating portion of the system shown in FIG. 3.

As shown in FIG. 5, the controlling circuit 13 comprises a NAND gate 19 for receiving information 15 concerning the PC field and a signal 17 from the comparator 7, and an OR gate 27 for receiving an output signal 21 of the NAND gate 19 and an END signal 23 indicating the completion of the execution of an instruction and for outputting a latch signal 25 to the first instruction register 1. The effective address calculating portion 9 comprises an adder 31 for adding contents 27 of a register of the register file 5 specified by the value of an IX field in the second instruction register 3 to a value 29 of a DISP field in the second instruction register 3. An output 33 of the adder 31 is taken into a EA field 35 of the first instruction register 1 according to the latch signal 25 from the OR gate 27.

An operation of the embodiment with the above-described arrangement will be described.

A preceding instruction is stored and held in the first instruction register 1. Information of a Reg1 field of the preceding instruction (i.e., the value of a DR field indicating a register to be used in executing the instruction in the first instruction register 1) is compared with information of a Reg2 field of a succeeding instruction (i.e., the value of an IX field indicating a register to be used for calculating an effective address of the instruction in the second instruction register 3) by the comparator 7.

As a result of the comparison, if the register to be used for the preceding instruction does not coincide with the register to be used for the succeeding instruction, a noncoincidence signal is supplied from the comparator 7 to the NAND gate 19 of the controlling circuit 13. In this case, the noncoincidence signal is "0" so that an output signal 21 of the NAND gate 19 will be "1" regardless of whether the value 15 of the PC field is "0" of "1". When the value 15 of the PC field if "0", it indicates that the contents of the register specified by the DR field remain unchanged before and after the execution of the instruction stored in the first instruction register 1. When the value 15 of the PC field is "1", it indicates that the contents of the register may change with the execution. Since the output signal 21 of the NAND gate is "1", the latch signal 25 of the OR gate 27 is "1" irrespective of the value of the END signal 23 indicating the completion of the execution of an instruction. Therefore, the contents of a register in the register file 5 specified by the value of the IX field of the second instruction register 3 are added to a value of the DISP field of the second instruction register 3 by the adder 31, and the output 33 of the adder 31 is taken into the EA field of the first instruction register 1 to complete the calculation of the effective address of the succeeding instruction. In parallel with the calculation of the effective address, the preceding instruction is executed by using a register of the register file 5 selected according to the information of the DR field.

If, as a result of the comparison, the register to be used by the preceding instruction coincides with the register to be used by the succeeding instruction, a coincidence signal is supplied from the comparator 7 to the NAND gate 19 of the controlling circuit 13. In this case, the coincidence signal is "1" so that the output signal 21 of the NAND gate 19 will be "0" if the value 15 of the PC field is "1", i.e., if the contents of a register indicated by the DR field are changed. Therefore, excepting the case when the END signal 23 is "1", i.e., the instruction stored in the first instruction register 1 is completed, the latch signal 25 of the OR gate 27 is "0" so that the output 33 of the adder 31 may not be taken into the EA field 35.

Therefore, the preceding instruction is executed first by using a register of the register file 5 selected according to the information of the DR field of the preceding instruction to define the contents of the register which has been used for the execution, and then the output 33 of the adder 31 will be taken into the EA field 35.

If the coincidence signal is "1" and if the contents of the register indicated by the DR field do not change, i.e., if the value 15 of the PC field is "0", the output signal 21 of the NAND gate 19 is "1". Therefore, irrespective of the value of the END signal 23, the latch signal 25 of the OR gate 27 will be "1" so that the output 33 of the adder 31 is taken into the EA field 35 of the first instruction register 1.

Due to this, the effective address of the succeeding instruction is calculated by using the register of the register file 5 selected according to the information of the IX field. In parallel with this, the preceding instruction is processed by using the same register which is used for calculating the effective address of the succeeding instruction.

For instance, in a machine language program to be executed in pipeline processing, suppose that an instruction of "CMP A, 01H" (hereinafter referred to as the "instruction <1>") is stored as a preceding instruction in the first instruction register 1, and that an instruction of "MOVE B, [A+02H]" (hereinafter referred to as the "instruction <2>") is stored as a succeeding instruction in the second instruction register 3. Here, the instruction <1> means that the contents of a register "A" holding 8-bit information is compared with the value 01H (hexadecimal expression) to set a flag, while the instruction <2> means that the contents of the register "A" are added to the value 02H (hexadecimal expression) to obtain a value which represents an address with which 8-bit information is read out of a memory to store the read information into the register B.

Figure 4:
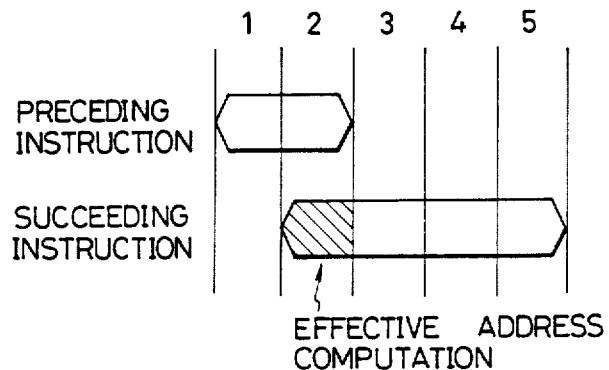
FIG. 4 is an explanatory view showing the operation of the system shown in FIG. 3.

In the pipeline processing, the register "A" to be used by the instruction <1> and the register "A" to be used for calculating an effective address of the instruction <2> are the same. Further, the contents of the register "A" are not changed with the execution of the instruction <1>. Therefore, the execution of the instruction <1> and the calculation of the effective address of the instruction <2> are carried out in parallel with each other as shown in FIG. 4.

Figure 1:
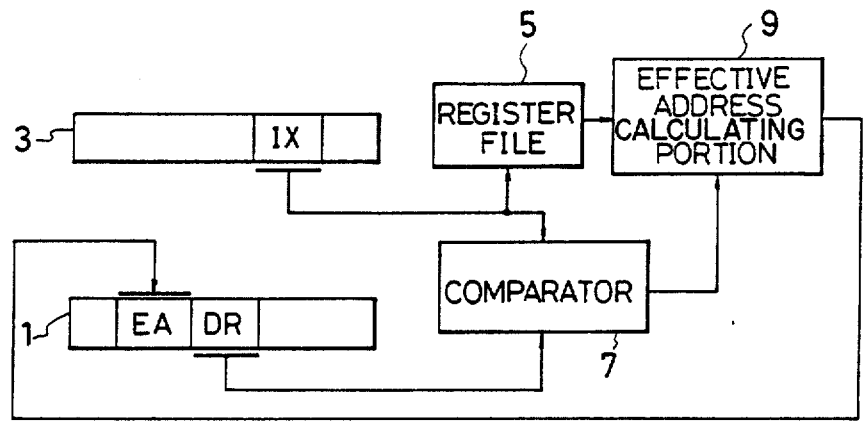
FIG. 1 is a block diagram showing the constitution of a conventional pipeline controlling system.
Figure 2:
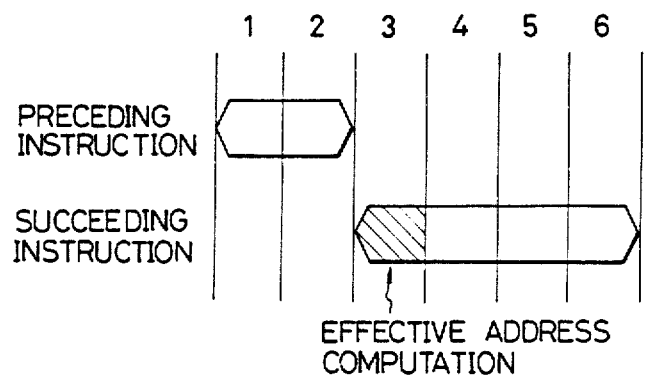
FIG. 2 is an explanatory view showing the operation of the system shown in FIG. 1.

As a result, the calculation of the effective address of the instruction <2> is effected without waiting for the completion of the execution of the instruction <1> so that the execution of the instruction <2> will be completed sooner than that carried out by the conventional system shown in FIG. 2.

According to the pipeline controlling system of the present invention, if information to be used for executing a preceding instruction coincides with information to be used for calculating the effective address of a succeeding instruction, and if the information used by the preceding instruction is not changed with the execution of the preceding instruction, the execution of the preceding instruction is carried out in parallel with the calculation of the effective address of the succeeding instruction so that the calculation of the effective address of the succeeding instruction is realized without waiting for the completion of the execution of the preceding instruction. As a result, parallel processing efficiency of the pipeline processing is improved, and the processing speed of a calculator for carrying out the pipeline processing is increased.

Various modifications will become possible for those skilled in the art after receiving the teachings of the present disclosure without departing from the scope thereof.

What is claimed is:

1. A pipeline controlling system for executing a preceding instruction in parallel with calculation of an effective address of a succeeding instruction, said pipeline controlling system comprising:
   a first storing means for storing and holding said preceding instruction while said preceding instruction is in an execute phase;
   a second storing means, connected to said first storing means, for storing and holding said succeeding instruction while said succeeding instruction is in an effective address calculation phase;
   a third storing means, connected to said second storing means, for storing and holding information for executing said preceding instruction and for calculating said effective address of said succeeding instruction;
   an effective address calculating means, connected to said first, second, and third storing means for calculating said effective address of said succeeding instruction stored in said second storing means;
   a comparing means, connected to said first second storing means, for comparing first information for designating in said third storing means a storing location of information for executing said preceding instruction with second information for designating in said third storing means a storing location of information for calculating said effective address; and
   a controlling means, connected to said first storing means and to said comparing means, for controlling said effective address calculating means in accordance with pipeline controlling region information which indicates whether or not information for calculating said effective address is changed with execution of said preceding instruction and in accordance with a comparison result of said comparing means, such that execution of said preceding instruction is capable of being carried out in parallel with calculation of said effective address of said succeeding instruction.

2. A pipeline controlling system as claimed in claim 1, wherein said comparing means outputs a coincidence signal when said first information coincides with said second information, and, even if said comparing means outputs said coincidence signal, said controlling means controls said effective address calculating means such that calculation of said effective address is carried out in parallel with execution of said preceding instruction when said pipeline controlling region information indicates that contents of said third storing means is not changed.

3. A pipeline controlling system as claimed in claim 2, wherein said comparing means outputs a noncoincidence signal when said first information does not coincide with said second information, and, when said comparing means outputs said noncoincidence signal, said controlling means controls said effective address calculating means such that calculation of said effective address is carried out in parallel with execution of said preceding instruction.

4. A pipeline controlling system as claimed in claim 3, wherein said controlling means controls said effective address calculating means such that calculation of said effective address is carried out after completion of execution of said preceding instruction when said comparing means outputs said coincidence signal and said pipeline controlling region information indicates that information for calculating said effective address is changed.

5. A method for executing a preceding instruction in parallel with calculation of an effective address of a succeeding instruction, comprising the steps of:
   storing and holding said preceding instruction while said preceding instruction is in an execute phase;
   storing and holding said succeeding instruction while said succeeding instruction in an effective address calculation phase;
   storing and holding information for executing said preceding instruction and for calculating said effective address of said succeeding instruction in a memory;
   comparing first information for designating a storing location of information for executing said preceding instruction with second information for designating a storing location of information for calculating said effective address; and
   generating control signals in accordance with pipeline controlling region information, which indicates whether or not information for calculating said effective address is changed during execution of said preceding instruction, and in accordance with a comparison result.

6. A method as claimed in claim 5, further comprising steps of:
   outputting a coincidence signal when said first information coincides with said second information and, regardless of whether said coincidence signal is outputted, generating control signals to cause calculation of said effective address parallel to execution of said preceding instruction when said pipeline controlling region information indicates that contents of said memory will not change during execution of said preceding instruction.

7. A method as set forth in claim 6 above, further comprising the steps of:
   outputting a noncoincidence signal when said first information does not coincide with said second information, and, when said noncoincidence signal is outputted, generating control signals to cause calculation of said effective address in parallel with execution of said preceding instruction.

8. A method as set forth in claim 7, further comprising the steps of:
   generating control signals to cause calculation of said effective address after completion of execution of said preceding instruction when said coincidence signal is outputted and said pipeline controlling region information indicates that information for calculating said effective address will change during execution of said preceding instruction.

* * * * *